United States Patent
Lee et al.

(10) Patent No.: US 11,410,045 B2
(45) Date of Patent: Aug. 9, 2022

(54) METHOD FOR FEW-SHOT LEARNING AND APPARATUS FOR EXECUTING THE METHOD

(71) Applicant: SAMSUNG SDS CO., LTD., Seoul (KR)

(72) Inventors: JoonHo Lee, Seoul (KR); JoonSeok Lee, Seoul (KR); SooAh Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 303 days.

(21) Appl. No.: 16/884,696

(22) Filed: May 27, 2020

(65) Prior Publication Data
US 2021/0365788 A1 Nov. 25, 2021

(30) Foreign Application Priority Data
May 19, 2020 (KR) .................. 10-2020-0059705

(51) Int. Cl.
*G06N 3/02* (2006.01)
*G06N 3/08* (2006.01)

(52) U.S. Cl.
CPC .................. *G06N 3/084* (2013.01)

(58) Field of Classification Search
CPC combination set(s) only.
See application file for complete search history.

(56) References Cited

U.S. PATENT DOCUMENTS

| | | | |
|---|---|---|---|
| 11,068,753 B2 * | 7/2021 | Akhazhanov | G06N 3/0472 |
| 11,087,045 B1 * | 8/2021 | Silberstein | G06F 30/20 |
| 2010/0100511 A1 * | 4/2010 | Hirose | G06K 9/00496 706/12 |
| 2017/0132528 A1 * | 5/2017 | Aslan | G06N 20/00 |
| 2019/0197670 A1 * | 6/2019 | Ferrer | G06K 9/6272 |
| 2020/0019842 A1 * | 1/2020 | Kim | G06N 3/088 |
| 2020/0089755 A1 | 3/2020 | Shazeer et al. | |
| 2020/0134472 A1 * | 4/2020 | Choi | G06N 3/082 |
| 2020/0252296 A1 * | 8/2020 | Iashyn | G06N 3/0454 |
| 2020/0294507 A1 * | 9/2020 | Kumar | G06K 9/627 |
| 2021/0035689 A1 * | 2/2021 | Liu | A61B 3/12 |
| 2021/0118423 A1 * | 4/2021 | Ping | G10L 13/047 |
| 2021/0166705 A1 * | 6/2021 | Chang | G10L 21/038 |
| 2021/0248765 A1 * | 8/2021 | Zhang | G06N 20/20 |
| 2021/0269046 A1 * | 9/2021 | Hashimoto | G06N 3/0454 |
| 2022/0138583 A1 * | 5/2022 | Hernandez Rivera | G06V 40/174 706/20 |
| 2022/0148173 A1 * | 5/2022 | Minchenkov | G06V 10/82 |
| 2022/0148242 A1 * | 5/2022 | Russell | G06N 3/0454 |

* cited by examiner

*Primary Examiner* — Cindy Trandai
(74) *Attorney, Agent, or Firm* — The PL Law Group, PLLC

(57) ABSTRACT

A few-shot learning method according to an embodiment may be performed in a computing device including one or more processors and a memory storing one or more programs executed by the one or more processors. The method may include performing a first task for subjecting a first model to few-shot learning (FSL) based on one or more meta-training data and performing a second task for subjecting a second model to supervised learning based on one or more derived data modified from the one or more meta-training data.

18 Claims, 12 Drawing Sheets

METHOD FOR FEW-SHOT LEARNING AND APPARATUS FOR EXECUTING THE METHOD

CROSS REFERENCE TO RELATED APPLICATIONS AND CLAIM OF PRIORITY

This application claims the benefit of Korean Patent Application No. 10-2020-0059705 filed on May 19, 2020 in the Korean Intellectual Property Office, the disclosure of which is incorporated herein by reference in its entirety.

TECHNICAL FIELD

Embodiments disclosed herein relate to a technology for performing few-shot learning.

BACKGROUND ART OF THE INVENTION

A typical deep learning model based on supervised learning requires a large amount of learning data which is labeled for meaningful learning. In particular, an image classification field requires a number of thousands to tens of thousands of images with a label for the learning of a model.

However, in reality, a case in which learning data is not sufficient, learning data is not labeled, or the amount of desired data among learning data is not sufficient frequently occurs. In this case, when a typical supervised learning method is applied, there is a problem in that overfitting occurs so that the performance of a model is not improved when used in real life.

Accordingly, various attempts have been made to improve the performance of a model based on few-shot learning (FSL) which is supervised learning in an environment in which the amount of labeled learning data is limited. However, there is still a problem in that overfitting still occurs, the performance is deteriorated when classifying complex data, or the like. Meanwhile, recently, there have been attempts to improve the performance of an FSL-based model by sharing a portion of the FSL-based model to simultaneously perform separate learning. However, there is a limitation in that not only a separate data set which is labeled is required for the above-described separate learning, but also, an operation for selecting data similar to existing data used in FSL from the separate data set must be preceded.

SUMMARY

Embodiments disclosed herein are to improve the performance of a model based on few-shot learning (FSL).

Means for Solving the Problem

A disclosed few-shot learning method according to an embodiment is a method performed in a computing device including one or more processors and a memory storing one or more programs executed by the one or more processors, the method including: performing a first task for subjecting a first model to few-shot learning (FSL) based on one or more meta-training data and performing a second task for subjecting a second model to supervised learning based on one or more derived data modified from the one or more meta-training data, wherein the first model includes a main body and a first head and the second model shares the main body with the first model and includes a second head, and the main body includes an artificial neural network (ANN) structure extracting feature vector for input data, and the first head and the second head each generates classification result based on the feature vector extracted from the main body.

The performing of the first task may include calculating first loss between the classification result of the first head for meta-training data inputted to the first model and label pre-assigned to the meta-training data inputted to the first model and updating learning parameter of the main body based on the first loss.

The performing of the second task may include calculating second loss between the classification result of the second head for derived data inputted to the second model and a self-label generated based on the derived data inputted to the second model and updating learning parameter of the main body based on the second loss.

A few-shot learning method according to another embodiment may further include performing a third task for subjecting a third model to weakly-supervised learning based on the one or more meta-training data, wherein the third model may share the main body with the first model and include a third head, and the third head may include a pseudo label generating module for generating pseudo label for the weakly-supervised learning based on the feature vector extracted from the main body, and a decoder in a reverse shape for the artificial neural network structure included in the main body.

The performing of the third task may include generating the pseudo label for meta-training data inputted to the third model, calculating third loss between area detection result of the decoder for the meta-training data inputted to the third model and the pseudo label, and updating learning parameter of the main body based on the third loss.

The few-shot learning method according to another embodiment may further include performing a fourth task for subjecting the first model to unsupervised learning based on the one or more meta-training data and one or more unlabeled additional data.

The performing of the fourth task may further include extracting, by the main body, feature vector for the input meta-training data and a feature vector for additional input data, respectively, determining, by the first head, source of the data previously inputted in the extracting step based on the feature vector for the input meta-training data and the feature vector for the additional input data, calculating fourth loss based on the determination result of the first head and the source of the data previously inputted in the extracting, and updating learning parameter of the main body based on the fourth loss.

The few-shot learning method according to another embodiment may further include performing a fifth task for subjecting the first model to unsupervised learning based on one or more unlabeled additional data and a clone model generated by replicating the first model.

The performing of the fifth task may further include extracting feature vector for the additional input data by each of the main body and a clone body included in the clone model, classifying the additional input data based on the feature vector for the additional input data by each of the first head and a clone head included in the clone model, calculating fifth loss between the classification result of the first head and the classification result of the clone head, and updating learning parameter of the main body based on the fifth loss.

An apparatus for performing a few-shot learning method according to a disclosed embodiment is an apparatus including one or more processors and a memory for storing one or more programs configured to be executed by the one or more processors, wherein the program includes commands to execute performing a first task for subjecting a first model to few-shot learning (FSL) based on one or more meta-training data and performing a second task for subjecting a second model to supervised learning based on one or more derived data modified from the one or more meta-training data, wherein the first model includes a main body and a first head, and the second model shares the main body with the first model and includes a second head, and the main body includes an artificial neural network (ANN) structure extracting a feature vector for input data, and the first head and the second head each generates a classification result based on the feature vector extracted from the main body.

The performing of the first task may include calculating first loss between the classification result of the first head for meta-training data inputted to the first model and a label pre-assigned to the meta-training data inputted to the first model and updating learning parameter of the main body based on the first loss.

The performing of the second task may include calculating second loss between the classification result of the second head for derived data inputted to the second model and a self-label generated based on the derived data inputted to the second model and updating learning parameter of the main body based on the second loss.

The program may further include commands to execute performing a third task for subjecting a third model to weakly-supervised learning based on the one or more meta-training data, wherein the third model may share the main body with the first model and include a third head, and the third head may include a pseudo label generating module for generating pseudo label for the weakly-supervised learning based on the feature vector extracted from the main body, and a decoder in a reverse shape for the artificial neural network structure included in the main body.

The performing of the third task may include generating the pseudo label for meta-training data inputted to the third model, calculating third loss between area detection result of the decoder for the meta-training data inputted to the third model and the pseudo label, and updating learning parameter of the main body based on the third loss.

The program may further include commands to execute performing a fourth task for subjecting the first model to unsupervised learning based on the one or more meta-training data and one or more unlabeled additional data.

The performing the fourth task may further include extracting, by the main body, feature vector for the input meta-training data and a feature vector for additional input data, respectively, determining, by the first head, source of the data previously inputted in the extracting step based on the feature vector for the input meta-training data and the feature vector for the additional input data, calculating fourth loss based on the determination result of the first head and the source of the data previously inputted in the extracting, and updating learning parameter of the main body based on the fourth loss.

The program may further include commands to execute performing a fifth task for subjecting the first model to unsupervised learning based on one or more unlabeled additional data and a clone model generated by replicating the first model.

The performing of the fifth task may further include extracting feature vector for additional input data input by each of the main body and a clone body included in the clone model, classifying the additional input data based on the feature vector for the additional input data by each of the first head and a clone head included in the clone model, calculating fifth loss between the classification result of the first head and the classification result of the clone head, and updating learning parameter of the main body based on the fifth loss.

According to embodiments disclosed herein, a main body shared in a few-shot learning process is learned on the basis of various learning mechanisms, so that it is possible to obtain a few-shot learning result having significantly improved feature representation performance compared to when learning is performed on the basis of a single learning mechanism.

In addition, according to embodiments disclosed herein, in applying various learning mechanisms, an existing data set is used without having to secure a separate data set, so that it is possible to try various types of learning without having to secure a data set similar to the existing data set.

In addition, according to embodiments disclosed herein, a self-label and a pseudo label are automatically generated from an existing data set without a separate user input, so that it is possible to save manpower and time required for labeling and the preparation of various types of learning.

In addition, according to embodiments disclosed herein, when there is an additional data set available, separate learning based on the additional data set is additionally performed to allow a main body to be additionally learned, so that it is possible to obtain a further improved few-shot learning result without changing the structure of a model for learning using an existing meta-training data set.

DETAILED DESCRIPTION OF THE INVENTION

Hereinafter, specific embodiments will be described with reference to the accompanying drawings. The following detailed description is provided to assist a comprehensive understanding of a method, a device and/or a system described herein. However, this is only exemplary and embodiments disclosed herein are not limited thereto.

In describing the embodiments, when it is determined that detailed descriptions of relevant known technologies may unnecessarily obscure the gist of the embodiments, the detailed descriptions will be omitted. In addition, the following terms are defined in consideration of the functions of the disclosed embodiments, and may vary depending on the intention or practice of a user or an operator. Therefore, the definitions of the terms will be made based on the contents throughout the present specification. The terms used in the detailed description are only to describe the embodiments, and should never be limited. Unless clearly used otherwise, the expression of a singular form includes the meaning of a plural form. In this description, expressions such as "inclusive" or "provided" are intended to refer to certain features, numbers, steps, operations, elements, parts or combinations thereof, and should not be construed to preclude the presence or possibility of one or more other features, numbers, steps, operations, elements, or combinations thereof in addition to those described.

Hereinafter, "data" may be data having any type, but are not necessarily limited thereto. When a particular type of data (e.g., image data) is essential in performing a method or a step to be disclosed, it will be understood as data of a corresponding type.

Figure 1:
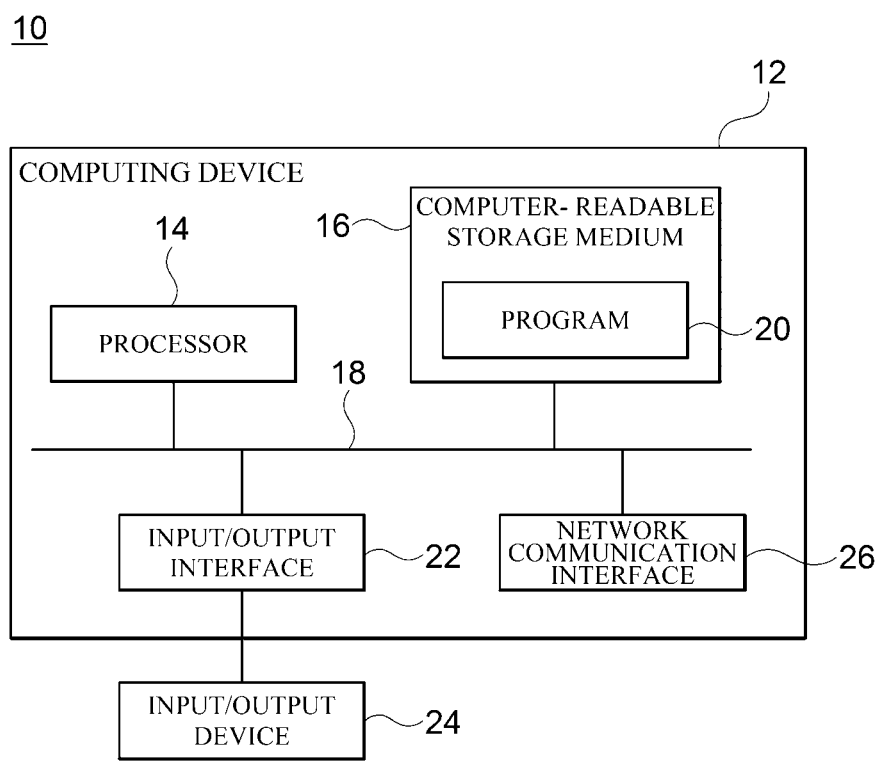
FIG. 1 is a block diagram for describing an example of a computing environment including a computing device suitable for use in exemplary embodiments.

FIG. 1 is a block diagram for describing an example of a computing environment 10 including a computing device suitable for use in exemplary embodiments. In an embodiment illustrated, each component may have a function or ability different from those described below, and an additional component may be included in addition to those described below.

The illustrated computing environment 10 includes a computing device 12. At this time, the computing device 12 may be a device for performing a few-shot learning method according to an embodiment.

The computing device 12 includes at least one processor 14, a computer-readable storage medium 16 and a communication bus 18. The processor 14 may allow the computing device 12 to operate according to the exemplary embodiment mentioned above. For example, the processor 14 may execute one or more programs stored in the computer-readable storage medium 16. The one or more programs may include one or more computer-executable commands, and when a computer-executable command is executed by the processor 14, the command may be configured to allow the computing device 12 to perform operations according to an exemplary embodiment.

The computer-readable storage medium 16 is configured to store a computer-executable command to a program code, program data, and/or other suitable types of information. A program 20 stored in the computer-readable storage medium 16 includes a set of commands executable by the processor 14. In an embodiment, the computer-readable storage medium 16 may be a memory (a volatile memory such as a random access memory, a non-volatile memory, or a suitable combination thereof), one or more magnetic disk storage devices, optical disk storage devices, flash memory devices, other types of storage media accessed by the computing device 12 and capable of storing desired information, or any suitable combination thereof.

The communication bus 18 includes the processor 14 and the computer-readable storage medium 16 to interconnect various other components of the computing device 12.

The computing device 12 may include one or more input/output interfaces 22 for providing an interface for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The exemplary input/output devices 24 may include a pointing device (such as a mouse or a track pad), a keyboard, a touch input device (such as a touch pad or a touch screen), a voice or sound input device, an input device such as various sensor devices and/or imaging devices, and/or an output device such as a display device, a printer, a speaker, and/or a network card. The exemplary input/output devices 24 is one component constituting the computing device 12, and may be included inside the computing device 12 or connected to the computing device 12 as a separate device distinct from the computing device 12.

Figure 2:
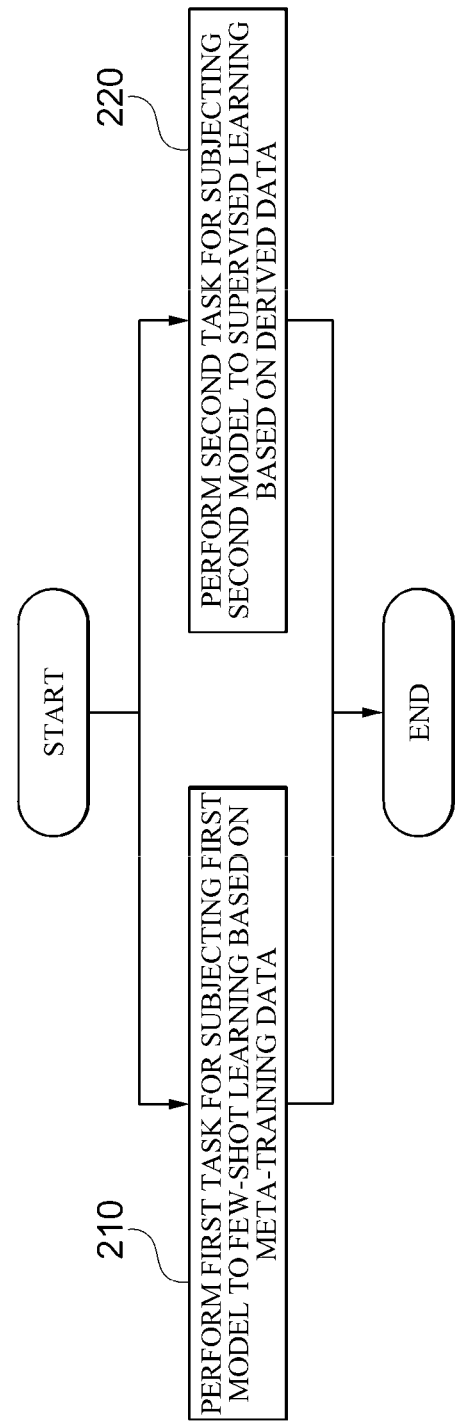
FIG. 2 is a flowchart for describing a few-shot learning method according to an embodiment.

FIG. 2 is a flowchart for describing a few-shot learning method according to an embodiment. The method illustrated in FIG. 2 may be executed by the above-described computing device 12.

In Step 210, the computing device 12 performs a first task for subjecting a first model to few-shot learning (FSL) based on one or more meta-training data.

At this time, the first model includes a main body and a first head, and the main body includes an artificial neural network (ANN) extracting a feature vector for input data, and the first head generates a classification result based on the feature vector extracted from the main body.

In the case of a typical "few-shot learned" model, a method for learning in an environment in which the amount of learning data labeled during a training process is limited is pre-learned, and then, between a support data set and a query data set given during a test process, learning is achieved using the support data set and performance is evaluated using the query data set. Therefore, typically, 'meta-learning' means learning a method for learning or learning to learn, so that hereinafter, 'meta-training data' refers to data used in a learning process for 'few-shot learning.'

In addition, hereinafter, the 'meta-training data' may be image data subjected to labeling, but is not necessarily limited thereto. Any data subjected labeling may be used as the meta-training data.

According to an embodiment, the main body may include a convolutional neural network (CNN) structure.

Specifically, the main body may include a network structure applied with various algorithms for few-shot learning, and may include, for example, a structure such as a matching network, a prototypical network, and a relation network, or a network structure applied with an algorithm such as Model-Agnostic Meta-Learning (MAML), First-Order MAML (FOMAML), and Meta-Stochastic Gradient Descent (Meta-SGD). However, a network structure which may be included in the main body is not limited thereto, and it is apparent that a more advanced network structure which may emerge in the future may also be included.

According to an embodiment, the first head may be represented as a hard label in the form of a one-hot vector illustrating to which category one or more meta-training data belong based on values of some feature vectors of feature vectors extracted by the main body, but is not necessarily limited thereto. For example, the first head may be represented by a soft label probabilistically illustrating which category one or more meta-training data belong to.

Figure 3:
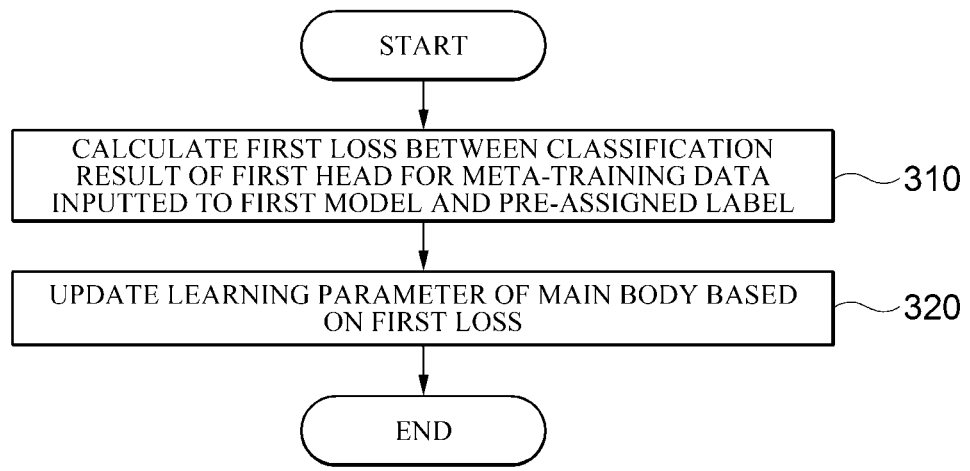
FIG. 3 is a flowchart for describing performing a first task according to an embodiment.

FIG. 3 is a flowchart for describing Step 210 of performing a first task according to an embodiment. The method illustrated in FIG. 3 may be executed by the above-described computing device 12.

In Step 310, the computing device 12 may calculate a first loss between the classification result of the first head for meta-training data input to the first model and a label pre-assigned to the meta-training data input to the first model.

According to an embodiment, the computing device 12 inputs the meta-training data into the main body of the first model during a forward pass process, extract feature vectors showing features of the meta-training data input by the main body, and based on values of some feature vectors of the extracted feature vectors, may predict which category the input meta-training data belong to in the form of a vector. Thereafter, the computing device 12 may calculate the first loss based on the predicted vector and a vector corresponding to the pre-assigned label.

In Step 320, the computing device 12 may update a learning parameter of the main body based on the first loss.

According to an embodiment, the computing device 12 may update the learning parameter of the main body using a backpropagation method based on the first loss during a backward pass process.

Referring back to FIG. 2, in Step 220, the computing device 12 performs a second task for subjecting a second model to supervised learning based on one or more derived data modified from one or more meta-training data.

At this time, the meta-training data is data included in the same data set including the data input to the first model to perform the first task. Through the above, the computing device 12 obtains the meta-training data from the same data set and performs the first task and the second task, and thus, may provide an improved few-shot learning result to a user without having a separate data set.

In addition, the second model shares the main body with the first model and includes a second head. The second head also generates a classification result based on a feature vector extracted from the main body. However, the feature vector used at this time is extracted from the derived data input to the second model by the main body. Through the above, in addition to the learning through the first task, the main body may be further learned through the second task, so that a further improved few-shot learning result may be provided to the user.

According to an embodiment, the derived data may be generated by selectively modifying a portion of pre-stored meta-training data. For example, when the meta-training data is data in an image form, the derived data may be generated by subjecting a patch forming a portion of the meta-training data to a rotation or flip. In this regard, a detailed description will be made with reference to FIG. 4 below.

Figure 4:
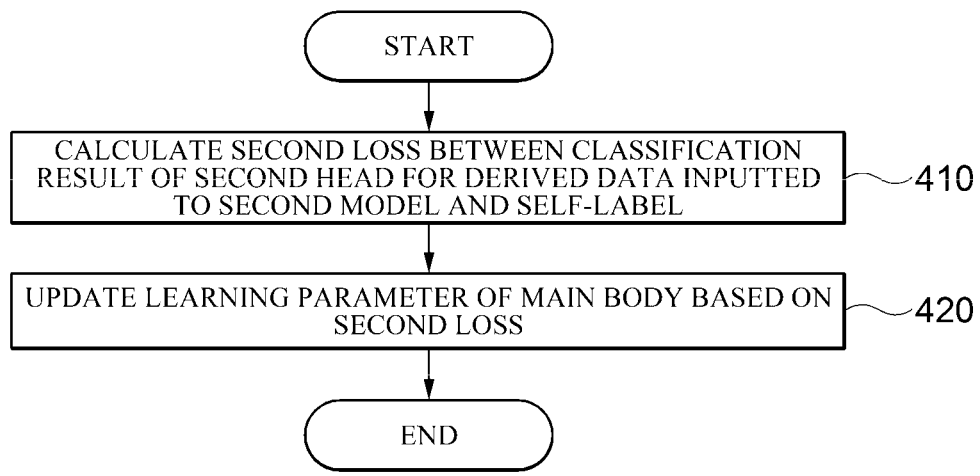
FIG. 4 is a flowchart for describing performing a second task according to an embodiment.

FIG. 4 is a flowchart for describing Step 220 of performing a second task according to an embodiment. The method illustrated in FIG. 4 may be executed by the above-described computing device 12.

In Step 410, the computing device 12 may calculate a second loss between the classification result of the second head for derived data input to the second model and a self-label generated based on the derived data input to the second model.

According to an embodiment, when the meta-training data is data in an image form, the derived data may be generated using a patch selection method.

Particularly, the derived data may be generated using either a flipped patch selection (FPS) method or a rotated patch selection (RPS) method among patch selection methods. The detailed application process of each method is as follows.

[FPS Method]

(1) One original image is divided into a predetermined number of patches. At this time, a patch may be generated by diving the original image N times in the horizontal direction and M times in the vertical direction (N and M are natural numbers of 1 or more), but the method for dividing the original image is not necessarily limited thereto.

(2) At least one patch is selected among divided patches.

(3) The selected at least one patch is flipped in either the left-right direction or the top-bottom direction. At this time, the selected patch may be flipped in any direction pre-set by a user in addition to the above-described directions, and when there is a plurality of selected patches, directions in which each patch is flipped may be different from each other.

(4) Derived data is generated by combining a flipped patch and the remaining portion which is not flipped.

[RPS Method]

Steps (1) and (2) are the same as in the above=described FPS method.

(2) The selected at least one patch is rotated by any angle in a clockwise or counterclockwise direction based on an original image. At this time, a user may select an angle by which the original image is rotated according to how many types of derived data are generated from one original image. In addition, when there is a plurality of selected patches, directions, or angles in which each patch is rotated may be different from each other.

(4) Derived data is generated by combining a rotated patch and the remaining portion which is not rotated.

For example, when an user wants to generate three types of derived data from one original image, the user may select one of patches generated by dividing the original image, and rotate the selected one patch by 90 degrees, 180 degrees, or 270 degrees in a clockwise direction to generate the three types of derived data.

According to an embodiment, when derived data is classified into a plurality of classes based on at least one type of variable changed to generate derived data among a plurality of variables forming the meta-training data, a self-label may refer to a class to which each derived datum belongs.

Specifically, when derived data is generated using the above-described FPS method, the derived data may be classified into a plurality of classes based on at least one of a variable for determining which patch is to be selected on an original image and a variable for determining a direction in which a selected patch is to be flipped, and a self-label may mean a class to which each derived datum belongs.

For example, if an original image is composed of n patches (wherein n is a natural number of 2 or more) among which k patches (wherein k is a natural number of n or less) are selected and derived data is classified into a plurality of classes based on a variable for determining which patch is to be selected on the original image, the number of combinations in which patches are selected is $_nC_k$, and thus, the number of classes and self-labels is also $_nC_k$.

However, in another embodiment, additional conditions may be considered after a patch is selected on the original image to adjust the number of classes and self-labels. Illustratively, derived data may be classified according to a combination in which the Manhattan distance between each selected patch among the above-described $_nC_k$ combinations is greater than or equal to a pre-set value, or derived data may be classified according to a combination in which the total sum of Manhattan distances among each selected patch among the above-described $_nC_k$ combinations is equal to or greater than a pre-set value.

Meanwhile, when derived data is generated using the above-described RPS method, the derived data may be classified into a plurality of classes based on at least one of a variable for determining which patch is to be selected on an original image, a variable for determining a direction in which a selected patch is to be rotated, and a variable for determining an angle by which the selected patch is to be rotated, and a self-label may mean a class to which each derived datum belongs.

According to an embodiment, the computing device 12 inputs the derived data into the main body of the second model during a forward pass process, extract feature vectors showing features of the derived data input by the main body, and based on values of some feature vectors of the extracted feature vectors, may predict which category the input derived data belong to in the form of a vector. Thereafter, the computing device 12 may calculate the second loss based on the predicted vector and a vector corresponding to a self-label.

In Step 420, the computing device 12 may update a learning parameter of the main body based on the second loss.

According to an embodiment, the computing device 12 may update the learning parameter of the main body using a backpropagation method based on the second loss during a backward pass process.

Figure 5:
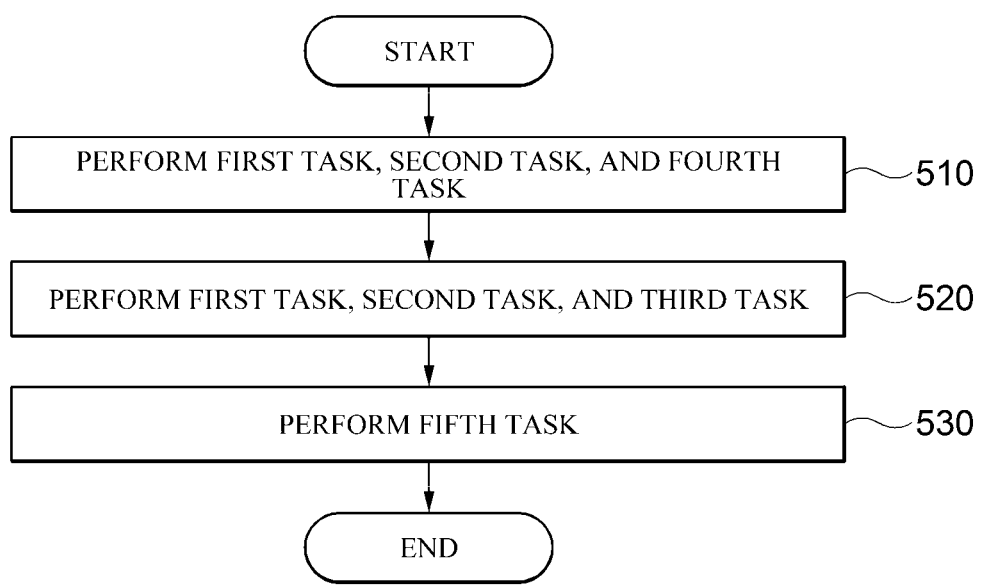
FIG. 5 is a flowchart for describing a few-shot learning method according to an additional embodiment.

FIG. 5 is a flowchart for describing a few-shot learning method according to an additional embodiment. The method illustrated in FIG. 5 may be executed by the above-described computing device 12.

In Step 510, the computing device 12 may selectively perform a fourth task while performing the above-described first task and second task.

Specifically, the fourth task may be selectively performed only when a separate data set is used in addition to a data set including one or more meta-training data. This is also the same for a fifth task, and thus, considering the characteristics of the fourth task and the fifth task, the fourth task and the fifth task will be described separately below with reference to FIG. 7 and FIG. 8, respectively.

In Step 520, the computing device 12 may simultaneously perform the above-described first task and a third task to be described with reference to FIG. 6 below, and may additionally perform the above-described second task, selectively.

Hereinafter, the third task refers to a task for subjecting a third model to weakly-supervised learning based on the one or more meta-training data. In addition, 'weakly-supervised learning' means to generate separate information, such as activation map based on a value predicted by the first head in the process of performing the above-described first task and performing a new supervised learning using the generated separate information as a correct answer.

At this time, the meta-training data is data included in the same data set including the data set input to the main body to perform the first task and the second task. Through the above, the computing device 12 obtains the meta-training data from the same data set and performs the first task, the second task, and the third task, and thus, may provide a further improved few-shot learning result to a user without having a separate data set.

Figure 6:
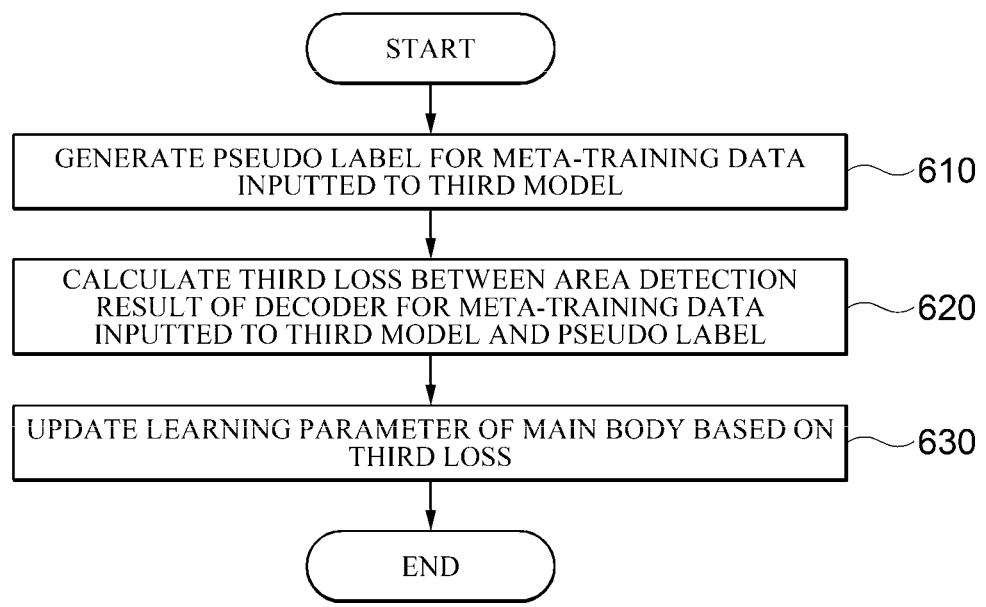
FIG. 6 is a flowchart for describing performing a third task according to an embodiment.

FIG. 6 is a flowchart for describing performing a third task according to an embodiment. The method illustrated in FIG. 6 may be executed by the above-described computing device 12.

In Step 610, the computing device 12 may generate a pseudo label for the meta-training data input to the third model.

According to an embodiment, the third model shares the main body with the first model and may include a third head.

At this time, the third head may include a pseudo label generating module for generating a pseudo label for the weakly-supervised learning based on the feature vector extracted from the main body.

Specifically, the pseudo label generating module may generate a prediction vector indicating a category to which the input meta-training data belongs based on values of some feature vectors of feature vectors extracted from the main body learned through the above-described Step 510.

Thereafter, the pseudo label generating module may generate a saliency map such as an class activation map (CAM) by assigning a weight to a feature vector value corresponding to the category to which the input meta-training data belongs and performing backpropagation on the main body based on the feature vector to which a weight has been assigned, and may generate a pseudo label in a mask form by performing thresholding on the generated saliency map.

In Step 620, the computing device 12 may calculate a third loss between an area detection result of a decoder for the meta-training data input to the third model and the pseudo label.

According to an embodiment, the third head may include a decoder in a reverse shape for the artificial neural network structure included in the main body.

In this case, the decoder may generate an area detection result corresponding to the input meta-training data by receiving a feature vector extracted from the learned main body and performing image segmentation. At this time, the decoder may be learned using an auto-learning method such as W-Net, but the method for learning the decoder is not necessarily limited thereto.

Thereafter, the third head uses a vector value corresponding to the pseudo label obtained from the pseudo label generating module as a ground-truth, and may calculate the third loss based on the difference between the ground-truth and a vector value corresponding to the area detection result obtained from the decoder.

In Step 630, the computing device 12 may update a learning parameter of the main body based on the third loss.

According to an embodiment, the computing device 12 may update the learning parameter of the main body using a backpropagation method based on the third loss during a backward pass process.

Through the above, in addition to the learning through the first task and the second task, the main body may be further learned through the third task, so that a further improved few-shot learning result may be provided to a user.

In Step 530, the computing device 12 may perform the fifth task.

Specifically, the fifth task may be selectively performed only when a separate data set is used in addition to a data set including one or more meta-training data.

According to an embodiment, the fifth task may refer to a task for subjecting the first model to unsupervised learning based on one or more unlabeled additional data and a clone model generated by replicating the first model.

Specifically, the clone model may be generated by replicating the first model learned through the above-described Step 510 and Step 520. At this time, a learning parameter of the clone model may be fixed. In this regard, a description will be made with reference to FIG. 8 below.

Figure 7:
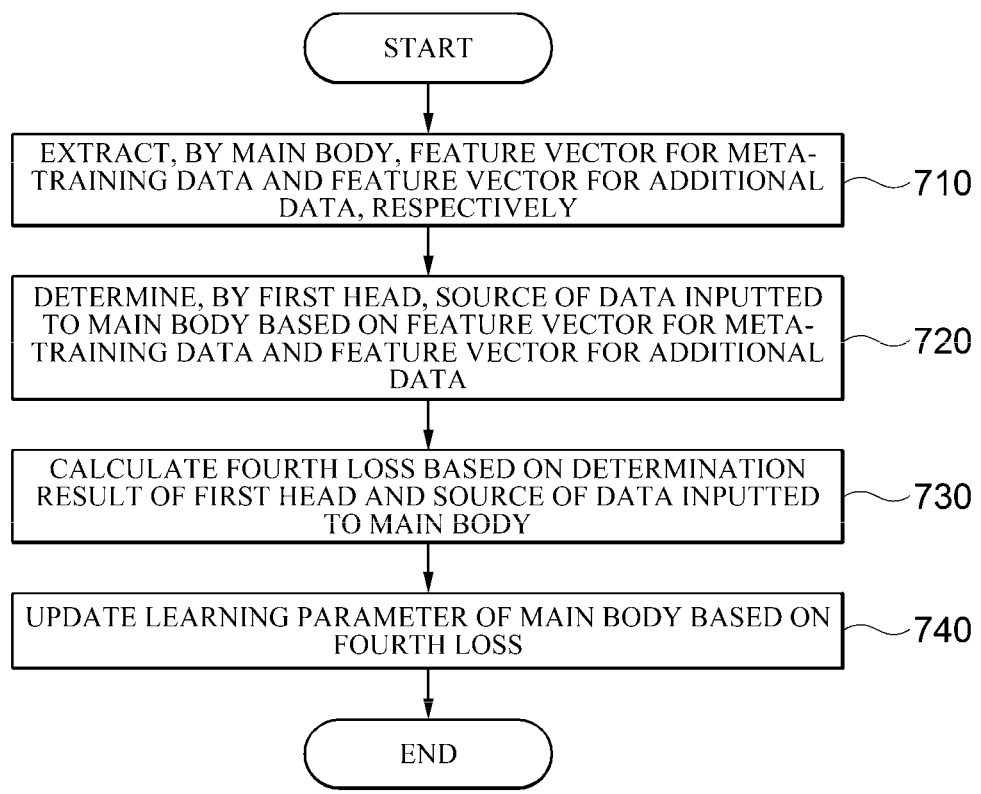
FIG. 7 is a flowchart for describing performing a fourth task according to an embodiment.

FIG. 7 is a flowchart for describing performing a fourth task according to an embodiment. The method illustrated in FIG. 7 may be executed, for example, by the above-described computing device 12.

In Step 710, the computing device 12 may allow the main body to extract a feature vector for the input meta-training data and a feature vector for additional input data.

In Step 720, the computing device 12 may allow the first head to determine a source of data input prior to Step 610 based on the feature vector for the input meta-training data and the feature vector for the additional input data.

According to an embodiment, when the main body extracts a feature vector for the data (hereinafter, referred to as a 'discrimination target') input prior to Step 610, the first head may calculate the difference (hereinafter, referred to as a 'first difference') between the value of the feature vector for the input meta-training data and the value of the feature vector for the discrimination target and the difference (hereinafter, referred to as a 'second difference') between the value of the feature vector for the additional input data and the value of the feature vector for the discrimination target.

Thereafter, by comparing the first difference and the second difference, the first head may determine a source of the discrimination target as a data set including the input meta-training data when the first difference is smaller, and may determine a source of the discrimination target as a data set including the additional input data.

In Step 730, the computing device 12 may calculate a fourth loss based on the determination result of the first head and the source of the data input prior to Step 610.

According to an embodiment, the computing device 12 receives different discrimination targets multiple times and compares the discrimination result of the first head indicating which data set is the source of each discrimination target and the actual source of each discrimination target, and may decrease the fourth loss each time the discrimination result of the first head and the actual source of the discrimination target are matched, and may increase the fourth loss each time there is a discrepancy.

According to an embodiment, the computing device 12 may perform the above-described Step 720 and Step 730 based on a generative adversarial network (GAN)-based algorithm.

According to an embodiment, the fourth loss may be a virtual adversarial training (VAT) loss, or an entropy minimization loss, but is not necessarily limited thereto.

In Step 740, the computing device 12 may update a learning parameter of the main body based on the fourth loss.

According to an embodiment, the computing device 12 may update the learning parameter of the main body using a backpropagation method based on the fourth loss during a backward pass process.

Through the above, in addition to the learning through the first task, the second task, and the third task, the main body may be further learned through the fourth task, so that a further improved few-shot learning result may be provided to a user.

Figure 8:
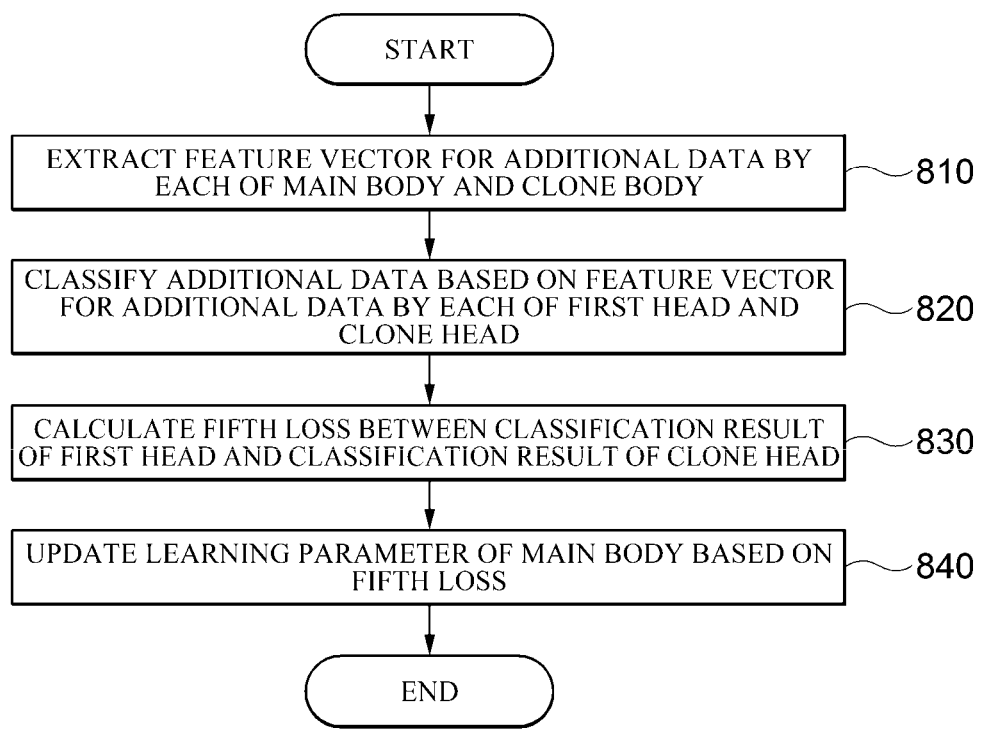
FIG. 8 is a flowchart for describing performing a fifth task according to an embodiment.

FIG. 8 is a flowchart for describing performing a fifth task according to an embodiment. The method illustrated in FIG. 8 may be executed, for example, by the above-described computing device 12.

In Step 810, the computing device 12 may allow each of the main body and a clone body included in a clone model to extract a feature vector for the additional input data.

In Step 820, the computing device 12 may allow each of the first head and a clone head included in the clone model to classify the additional input data based on the feature vector of the additional input data.

According to an embodiment, the classification result of the first head and the classification result of the clone head may be generated in the form of a soft label, respectively. To this end, the first head and the clone head may use a softmax function in the classification process. However, an available function is not necessarily limited thereto.

In Step 830, the computing device 12 may calculate a fifth loss between the classification result of the first head and the classification result of the clone head.

According to an embodiment, the computing device 12 may calculate the fifth loss based on the difference between each element value of a soft label corresponding to the classification result of the first head and each element value of a soft label corresponding to the classification result of the clone head.

In Step 840, the computing device 12 may update a learning parameter of the main body based on the fifth loss.

According to an embodiment, the computing device 12 may update the learning parameter of the main body using a backpropagation method based on the fifth loss during a backward pass process.

Through the above, in addition to the learning through the first task, the second task, the third task, and the fourth task, the main body may be further learned through the fifth task, so that a further improved few-shot learning result may be provided to a user.

Meanwhile, in performing the above-described Step 810 to Step 840, the computing device 12 may additionally receive one or more meta-training data and use the same for the learning of the first model.

In the above flowcharts illustrated in FIG. 2 to FIG. 8, the method is disclosed by being divided into a plurality of steps. However, at least some of the steps may be performed in a different order, performed simultaneously, performed by being combined with other steps, omitted, performed by being divided into detailed steps, or performed by being added with one or more steps not illustrated.

Figure 9:
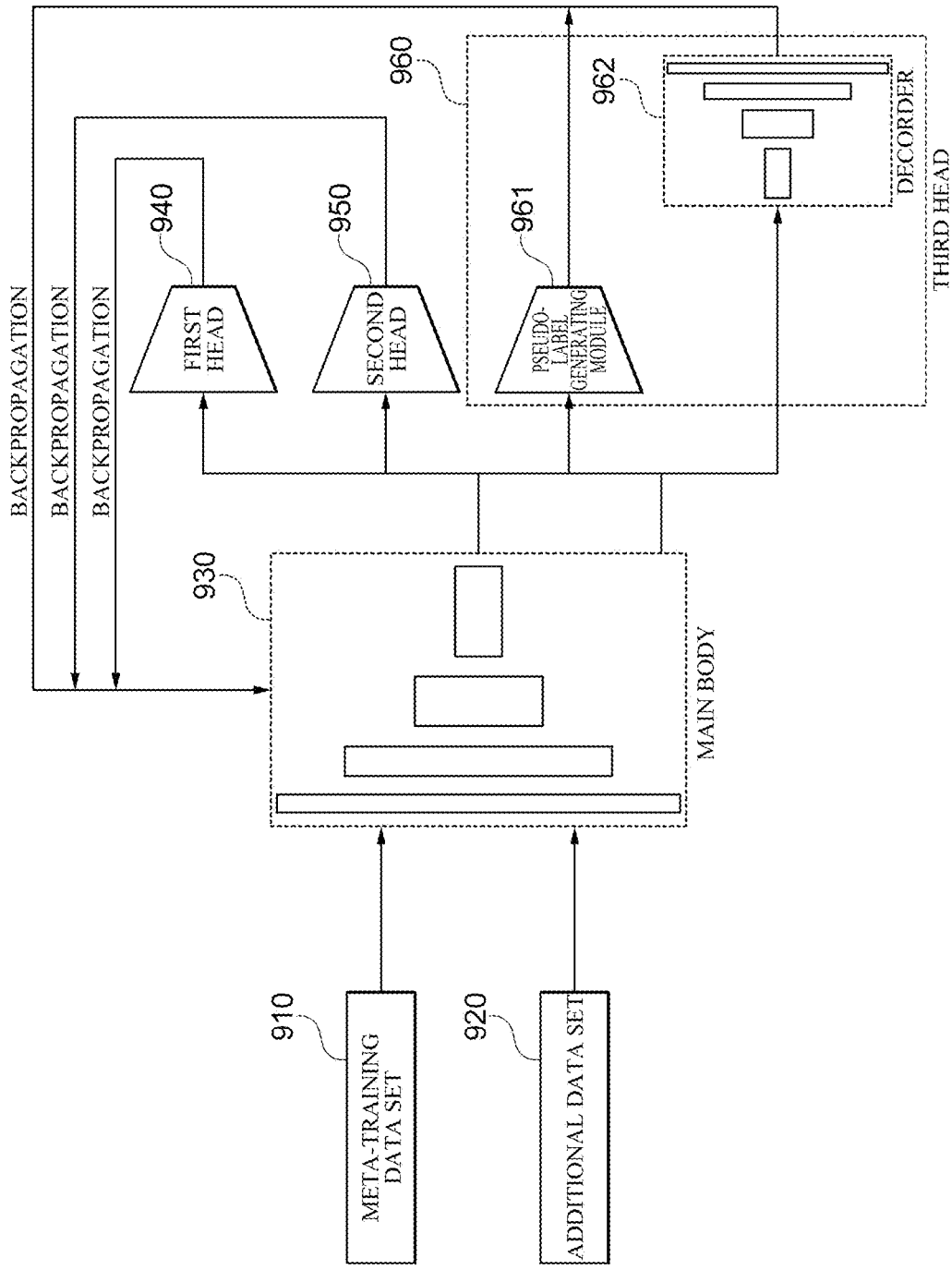
FIG. 9 is a diagram schematically illustrating a few-shot learning structure according to an embodiment.

FIG. 9 is a diagram schematically illustrating a few-shot learning structure according to an embodiment.

Referring to FIG. 9, a meta-training data set 910 including one or more meta-training data, an additional data set 920 including one or more additional data, and a main body 930 in which a learning parameter is updated by performing the first to fifth tasks, a first head 940, a second head 950, and a third head 960 including a pseudo label generating module 961 and a decoder 962 are illustrated.

In the following FIG. 10 to FIG. 12, each component of the above-described FIG. 9 is selectively illustrated to describe learning by each step.

Figure 10:
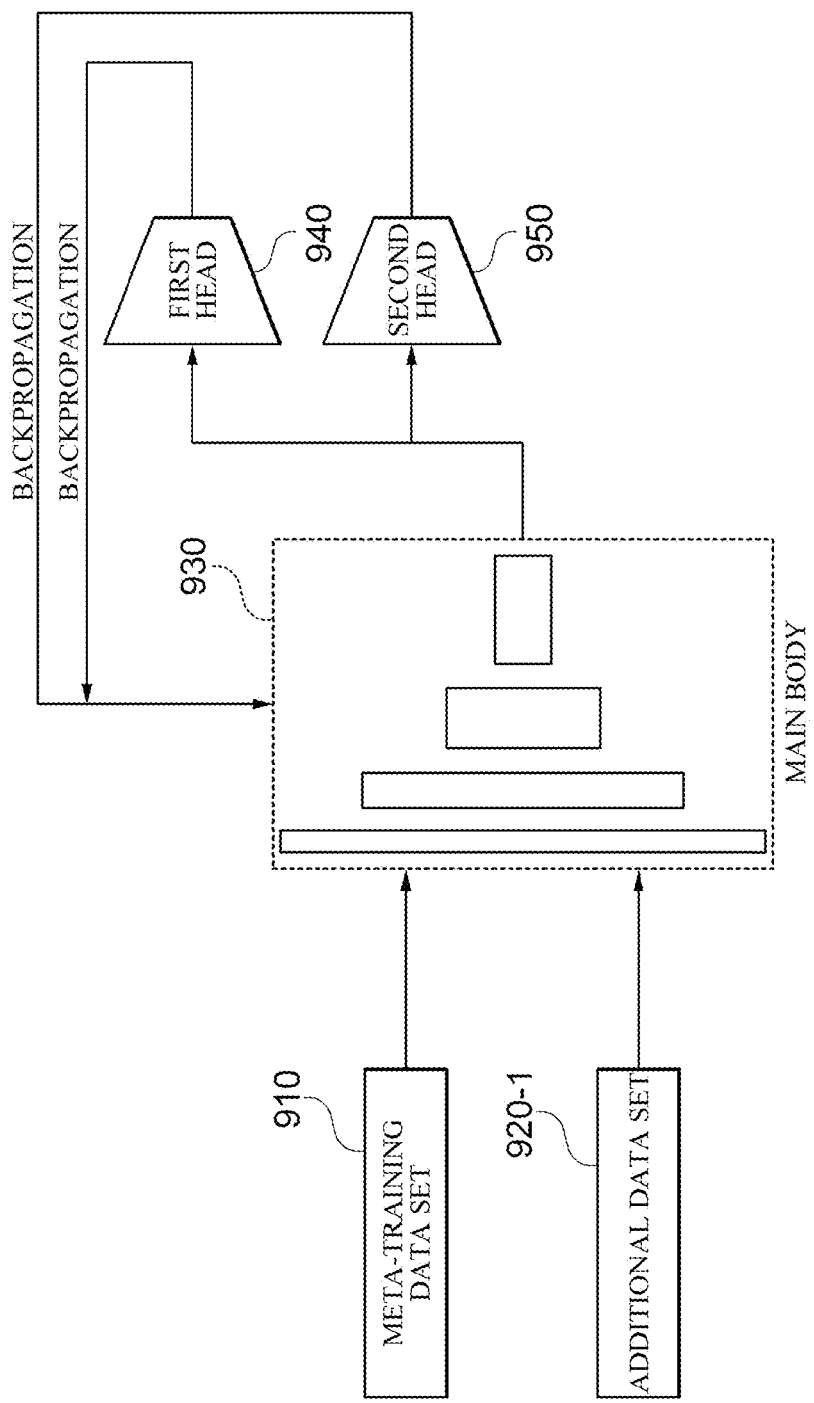
FIG. 10 is a diagram schematically illustrating a one-step learning structure according to an embodiment.

FIG. 10 is a diagram schematically illustrating a one-step learning structure according to an embodiment.

First, in performing the first task, one or more meta-training data obtained from the meta-training data set 910 is processed through the main body 930 and the first head 940 during a forward pass process, and a learning parameter of the main body 930 is updated using a backpropagation method based on the first loss during a backward pass process.

Meanwhile, in performing the second task, the one or more meta-training data obtained from the meta-training data set 910 is processed through the main body 930 and the second head 950 during the forward pass process, and the learning parameter of the main body 930 is updated using a backpropagation method based on the second loss during the backward pass process.

Selectively, in performing the fourth task, the one or more meta-training data obtained from the meta-training data set 910 and one or more additional data obtained from an additional data set 920-1 are processed through the main body 930 and the first head 940 during the forward pass process, and the learning parameter of the main body 930 is updated using a backpropagation method based on the second loss during the backward pass process.

According to an embodiment, the fourth task may be selectively performed when similarity between the additional data included in the additional data set 920-1 and the meta-training data included in the meta-training data set 910 is high.

Illustratively, the determination of the similarity may be achieved in consideration of the distribution of each of the meta-training data included in the meta-training data set 910 and the additional data included in the additional data set 920-1, but is not necessarily limited thereto. In determining the similarity, various methods in addition to the above may be applied.

Figure 11:
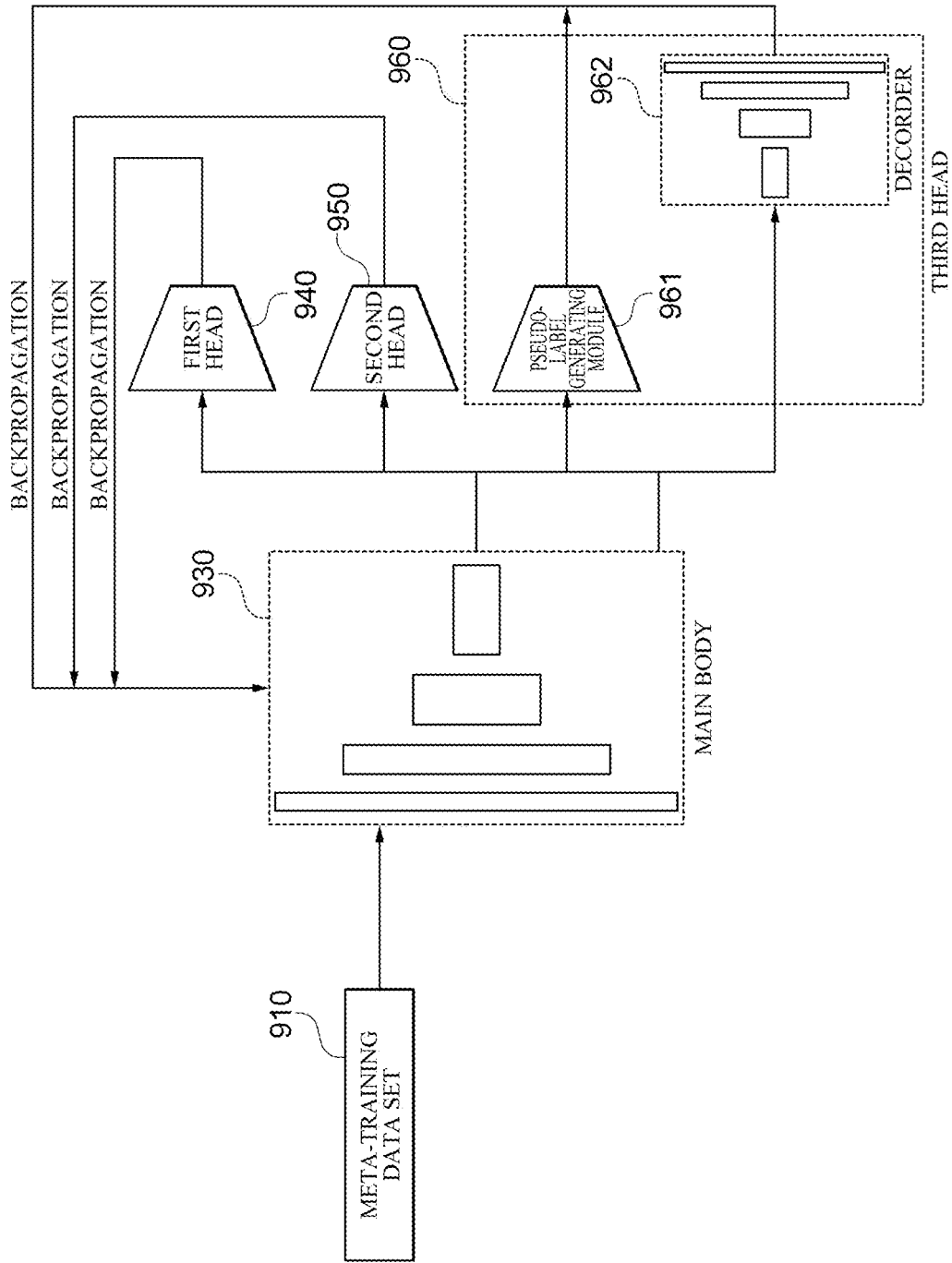
FIG. 11 is a diagram schematically illustrating a two-step learning structure according to an embodiment.

FIG. 11 is a diagram schematically illustrating a two-step learning structure according to an embodiment.

First, in performing the first task, one or more meta-training data obtained from the meta-training data set 910 is processed through the main body 930 and the first head 940 during a forward pass process, and a learning parameter of the main body 930 is updated using a backpropagation method based on the first loss during a backward pass process.

Meanwhile, in performing the third task, the one or more meta-training data obtained from the meta-training data set 910 is processed through the main body 930 and the third head 960 during the forward pass process, and the learning parameter of the main body 930 is updated using a backpropagation method based on the third loss during the backward pass process.

Selectively, in performing the second task, the one or more meta-training data obtained from the meta-training data set 910 is processed through the main body 930 and the second head 950 during the forward pass process, and the learning parameter of the main body 930 is updated using a backpropagation method based on the second loss during the backward pass process.

Figure 12:
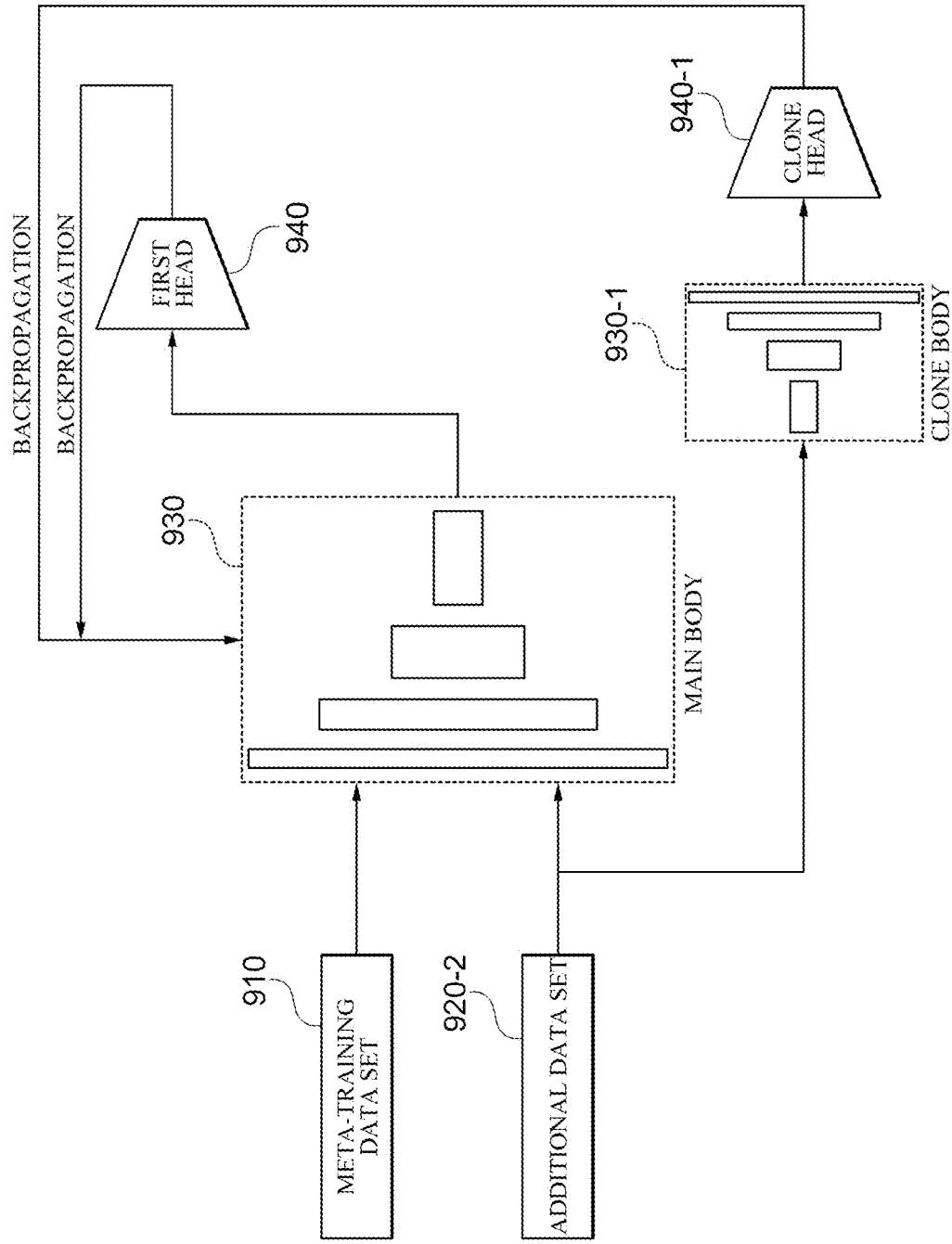
FIG. 12 is a diagram schematically illustrating a three-step learning structure according to an embodiment.

FIG. 12 is a diagram schematically illustrating a three-step learning structure according to an embodiment.

Referring to FIG. 12, in selectively performing the fifth task, one or more additional data obtained from an additional data set 920-2 is processed through the main body 930, the first head 940, a clone body 930-1, and a clone head 940-1 during a forward pass process, and a learning parameter of the main body 930 is updated using a backprogation method based on the fifth loss during a backward pass process.

According to an embodiment, the fifth task may be performed by additionally using one or more meta-training data obtained from the meta-training data set 910.

According to an embodiment, the fifth task may be selectively performed when similarity between the additional data included in the additional data set 920-2 and the meta-training data included in the meta-training data set 910 is low.

Illustratively, the determination of the similarity may be achieved in consideration of the distribution of each of the meta-training data included in the meta-training data set 910 and the additional data included in the additional data set 920-2, but is not necessarily limited thereto. In determining the similarity, various methods in addition to the above may be applied.

Meanwhile, an embodiment of the present invention may include a program for performing the methods described herein on a computer, and a computer-readable recording medium including the program. The computer-readable recording medium may include, alone or in combination, program instructions, local data files, local data structures, and the like. The medium may be specially designed and configured for the present invention, or may be one commonly used in the field of computer software. Examples of computer-readable recording media include magnetic media such as hard disks, floppy disks, and magnetic tapes, optical recording media such as CD-ROMs and DVDs, and hardware devices specially configured to store and execute program instructions, such as ROMs, RAMs, flash memories, and the like. Examples of the program may include machine codes, such as those created by a compiler, as well as advanced language codes which may be executed by a computer using an interpreter and the like.

When learning is terminated according to an embodiment of the present invention, a user may obtain an excellent few-shot learning result with only a small amount of random data during an execution process by using the first model having improved few-shot learning performance due to the learning.

Although representative embodiments of the present invention have been described in detail above, those skilled in the art will understand that various modifications for the above-described embodiments are available within the scope of the present invention without departing from the scope of the present invention. Therefore, the scope of the present invention should not be limited to the described embodiments, but should be defined by the following claims as well as the equivalents thereof.

The invention claimed is:

1. A few-shot learning method performed in a computing device including one or more processors and a memory storing one or more programs executed by the one or more processors, the method comprising:
    performing a first task for subjecting a first model to few-shot learning (FSL) based on one or more meta-training data; and
    performing a second task for subjecting a second model to supervised learning based on one or more derived data modified from the one or more meta-training data,
    wherein the first model includes a main body and a first head;
    the second model shares the main body with the first model and includes a second head;
    the main body includes an artificial neural network (ANN) structure extracting feature vector for input data; and
    the first head and the second head each generate classification result based on the feature vector extracted from the main body.

2. The few-shot learning method of claim 1, wherein the performing of the first task comprises:
    calculating first loss between the classification result of the first head for meta-training data inputted to the first model and label pre-assigned to the meta-training data inputted to the first model; and
    updating learning parameter of the main body based on the first loss.

3. The few-shot learning method of claim 1, wherein the performing of the second task comprises:
    calculating second loss between the classification result of the second head for derived data inputted to the second model and a self-label generated based on the derived data inputted to the second model; and updating learning parameter of the main body based on the second loss.

4. The few-shot learning method of claim 1, further comprising performing a third task for subjecting a third model to weakly-supervised learning based on the one or more meta-training data, wherein the third model shares the main body with the first model and includes a third head; and the third head includes a pseudo label generating module for generating pseudo label for the weakly-supervised learning based on the feature vector extracted from the main body, and a decoder in a reverse shape for the artificial neural network structure included in the main body.

5. The few-shot learning method of claim 4, wherein the performing of the third task comprises:

generating the pseudo label for meta-training data inputted to the third model;

calculating third loss between area detection result of the decoder for the meta-training data inputted to the third model and the pseudo label; and updating learning parameter of the main body based on the third loss.

6. The few-shot learning method of claim 1, further comprising performing a fourth task for subjecting the first model to unsupervised learning based on the one or more meta-training data and one or more unlabeled additional data.

7. The few-shot learning method of claim 6, wherein the performing of the fourth task comprises:

extracting, by the main body, feature vector for the input meta-training data and a feature vector for additional input data, respectively;

determining, by the first head, source of the data previously inputted in the extracting based on the feature vector for the input meta-training data and the feature vector for the additional input data;

calculating fourth loss based on the determination result of the first head and the source of the data previously inputted in the extracting; and updating learning parameter of the main body based on the fourth loss.

8. The few-shot learning method of claim 1, further comprising performing a fifth task for subjecting the first model to unsupervised learning based on one or more unlabeled additional data and a clone model generated by replicating the first model.

9. The few-shot learning method of claim 8, wherein the performing of the fifth task comprises:

extracting feature vector for the additional input data by each of the main body and a clone body included in the clone model;

classifying the additional input data based on the feature vector for the additional input data by each of the first head and a clone head included in the clone model;

calculating fifth loss between the classification result of the first head and the classification result of the clone head; and updating learning parameter of the main body based on the fifth loss.

10. An apparatus comprising:

one or more processors; and a memory for storing one or more programs configured to be executed by the one or more processors, wherein:

the program includes commands to execute:

performing a first task for subjecting a first model to few-shot learning (F SL) based on one or more meta-training data; and performing a second task for subjecting a second model to supervised learning based on one or more derived data modified from the one or more meta-training data, wherein:

the first model includes a main body and a first head;

the second model shares the main body with the first model and includes a second head;

the main body includes an artificial neural network (ANN) structure extracting a feature vector for input data; and the first head and the second head each generate a classification result based on the feature vector extracted from the main body.

11. The apparatus of claim 10, wherein the performing of the first task comprises:

calculating first loss between the classification result of the first head for meta-training data inputted to the first model and label pre-assigned to the meta-training data inputted to the first model; and updating learning parameter of the main body based on the first loss.

12. The apparatus of claim 10, wherein the performing of the second task comprises:

calculating second loss between the classification result of the second head for derived data inputted to the second model and a self-label generated based on the derived data inputted to the second model; and updating learning parameter of the main body based on the second loss.

13. The apparatus of claim 10, wherein the program further includes commands to execute performing a third task for subjecting a third model to weakly-supervised learning based on the one or more meta-training data, wherein the third model shares the main body with the first model and includes a third head; and the third head includes a pseudo label generating module for generating pseudo label for the weakly-supervised learning based on the feature vector extracted from the main body, and a decoder in a reverse shape for the artificial neural network structure included in the main body.

14. The apparatus of claim 13, wherein the performing of the third task comprises:

generating the pseudo label for meta-training data inputted to the third model;

calculating third loss between area detection result of the decoder for the meta-training data inputted to the third model and the pseudo label; and updating learning parameter of the main body based on the third loss.

15. The apparatus of claim 10, wherein the program further includes commands to execute performing a fourth task for subjecting the first model to unsupervised learning based on the one or more meta-training data and one or more unlabeled additional data.

16. The apparatus of claim 15, wherein the performing of the fourth task comprises:
- extracting, by the main body, feature vector for the input meta-training data and a feature vector for additional input data, respectively;
- determining, by the first head, source of the data previously inputted in the extracting step based on the feature vector for the input meta-training data and the feature vector for the additional input data;
- calculating fourth loss based on the determination result of the first head and the source of the data previously inputted in the extracting; and
- updating learning parameter of the main body based on the fourth loss.

17. The apparatus of claim 10, wherein the program further includes commands to execute performing a fifth task for subjecting the first model to unsupervised learning based on one or more unlabeled additional data and a clone model generated by replicating the first model.

18. The apparatus of claim 17, wherein the performing of the fifth task comprises:
- extracting feature vector for additional input data by each of the main body and a clone body included in the clone model;
- classifying the additional input data based on the feature vector for the additional input data by each of the first head and the clone head included in the clone model;
- calculating fifth loss between the classification result of the first head and the classification result of the clone head; and
- updating learning parameter of the main body based on the fifth loss.

* * * * *